US006679283B1

(12) United States Patent
Coscarella

(10) Patent No.: US 6,679,283 B1
(45) Date of Patent: Jan. 20, 2004

(54) VALVE INSPECTION CHAMBER

(76) Inventor: Gabe Coscarella, 15703-64 Street, Edmonton (CA), T5Y 2N5

( * ) Notice: Subject to any disclaimer, the term of this patent is extended or adjusted under 35 U.S.C. 154(b) by 0 days.

(21) Appl. No.: 10/194,658

(22) Filed: Jul. 11, 2002

(51) Int. Cl.[7] .......................... F16K 43/00; B23P 19/04; B25B 27/24
(52) U.S. Cl. ................ 137/315.41; 29/213.1; 29/221.6; 29/244; 137/315.11; 137/315.16; 137/315.29; 137/454.2; 137/613; 137/614.2
(58) Field of Search .......................... 137/15.08, 15.17, 137/15.18, 15.23, 315.01, 315.11, 315.16, 315.29, 315.41, 454.2, 364, 368, 613, 614.19, 614.2; 29/213.1, 221.6, 244, 256

(56) References Cited

U.S. PATENT DOCUMENTS

| 2,628,056 | A |   | 2/1953  | Fuller ........................ 251/147 |
| 3,538,514 | A |   | 11/1970 | Schimert et al. ......... 137/527.8 |
| 3,566,500 | A |   | 3/1971  | Simon .................... 29/890.144 |
| 3,626,148 | A |   | 12/1971 | Woytowich et al. ........ 219/208 |
| 3,797,811 | A |   | 3/1974  | Jullien et al. ............. 137/527.8 |
| 3,824,629 | A |   | 7/1974  | Shiley ...................... 137/527.8 |
| 3,948,282 | A |   | 4/1976  | Yano ........................... 137/318 |
| 4,064,902 | A |   | 12/1977 | Swenson ..................... 137/370 |
| 4,311,163 | A |   | 1/1982  | Langevin ................ 137/315.01 |
| 4,391,289 | A |   | 7/1983  | Adams ...................... 137/15.07 |
| 4,605,031 | A |   | 8/1986  | Gründ ....................... 137/15.23 |
| 4,961,444 | A | * | 10/1990 | Morgan et al. .......... 137/454.2 |
| 5,020,567 | A | * | 6/1991  | Proulx .................... 137/315.41 |
| 5,469,881 | A |   | 11/1995 | Phan et al. ............. 137/315.27 |
| 5,826,609 | A |   | 10/1998 | Watts ..................... 137/315.41 |
| 6,029,684 | A |   | 2/2000  | Watts ..................... 137/315.41 |
| 6,125,878 | A |   | 10/2000 | Watts ..................... 137/315.41 |
| 6,186,164 | B1| * | 2/2001  | Pfeifer et al. .......... 137/315.41 |

* cited by examiner

Primary Examiner—George L. Walton
(74) Attorney, Agent, or Firm—Christensen O'Connor Johnson Kindness PLLC

(57) ABSTRACT

A valve inspection chamber includes a housing having a vertical inspection and valve retrieval opening. A valve cassette is provided which includes a frame and a valve member movable relative to the frame between an open position and a closed position. A valve cassette receptacle is positioned in the housing. The valve cassette is inserted and retrieved through the vertical inspection and valve retrieval opening of the housing using a retrieval tool.

17 Claims, 16 Drawing Sheets

US 6,679,283 B1

VALVE INSPECTION CHAMBER

FIELD OF THE INVENTION

The present invention relates to a valve inspection chamber

BACKGROUND OF THE INVENTION

There is a massive infrastructure network of underground piping in every major city to carry liquids, such as drinking water or sewage. Valves of various types are placed strategically along the network, to prevent unwanted backflows in the network and enable portions of the piping to be isolated during servicing. When valves are buried more than two feet below the surface of the ground, manholes are generally required in order to provide access to the valves for inspection or servicing.

U.S. Pat. Nos. 5,826,609; 6,029,684; 6,125,878 (Watts) considered together describe a system that enables valves to be inspected and serviced without the use of the manhole. This is accomplished through a methodology described and claimed in U.S. Pat. No. 5,826,609, in which a retrieval tool described and claimed in U.S. Pat. No. 6,125,878 is used to recover for inspection and replacement a valve member from a valve inspection chamber described in U.S. Pat. No. 6,029,684.

SUMMARY OF THE INVENTION

The present invention relates to an alternative configuration of valve inspection chamber.

According to the present invention there is provided a valve inspection chamber which includes a housing having a first horizontal flow opening, a second horizontal flow opening, and a vertical inspection and valve retrieval opening. A valve cassette is provided which includes a frame and a valve member movable relative to the frame between an open position and a closed position. A valve cassette receptacle is positioned in the housing in a flow path of one of the first horizontal flow opening and the second horizontal flow opening and aligned with the vertical inspection and valve retrieval opening, such that the valve cassette can be inserted and retrieved through the vertical inspection and retrieval opening. Means is provided for maintaining the valve cassette in engagement with the valve cassette receptacle until a preset vertical force is exerted. Means for engaging a retrieval tool is positioned on either the frame or the valve member of the valve cassette.

With the Watts system, hinge pins for the flapper valve member were snapped into clips in the housing. With the valve inspection chamber, as described above, a valve cassette is slid into a valve cassette receptacle within the housing. This provides a number of advantages. It can be adapted to a variety of valve types, such as gate valves; whereas the Watts system could only be used with flapper valves. More importantly, it simplifies the installation procedure and the tool that is used for installation and make possible further refinements, as will hereinafter be further described.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Figure 1:
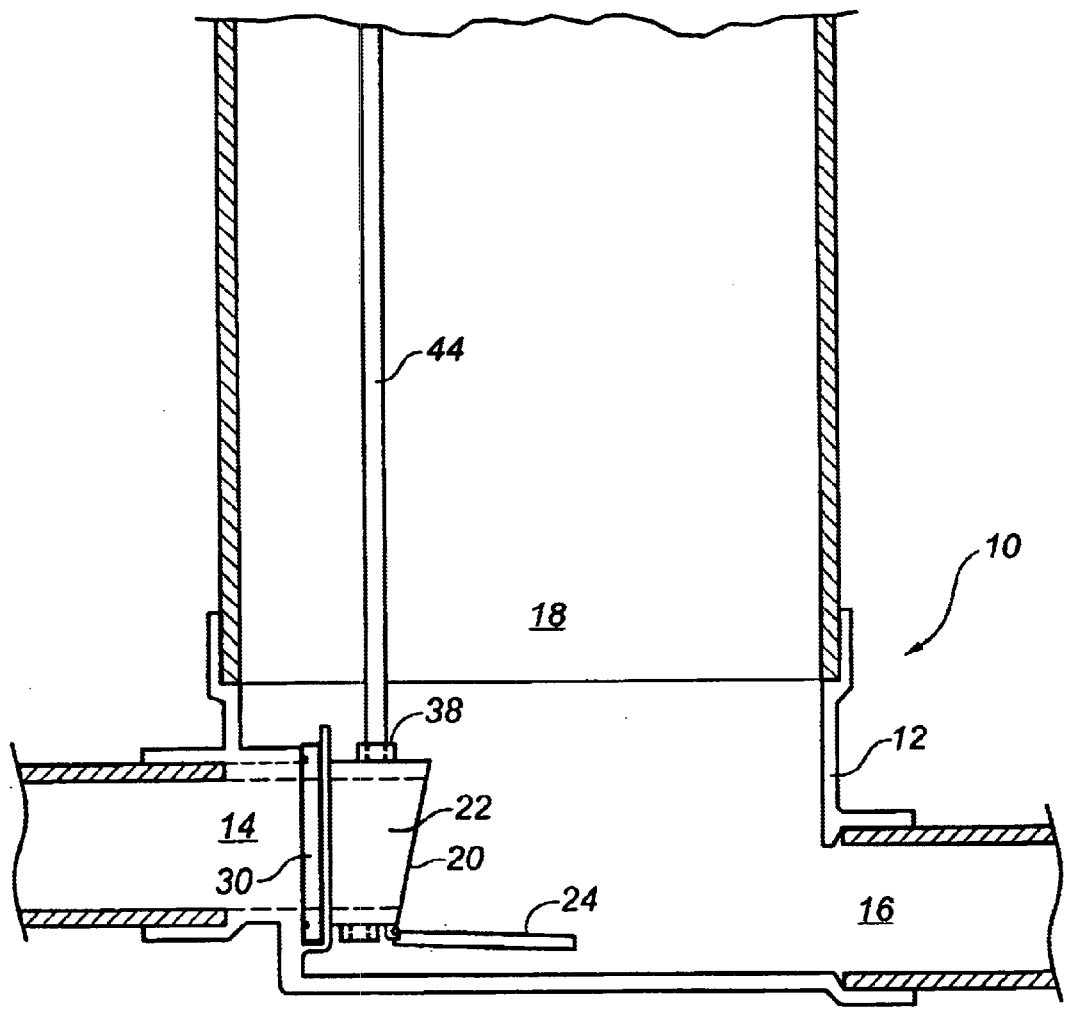
FIG. 1 is a side elevation, in section, of a valve inspection chamber fabricated in accordance with the teachings of the present invention with valve cassette and retrieval tool.

The preferred embodiment, a valve inspection chamber generally identified by reference numeral 10, will now be described with reference to FIGS. 1 through 17.

Figure 8:
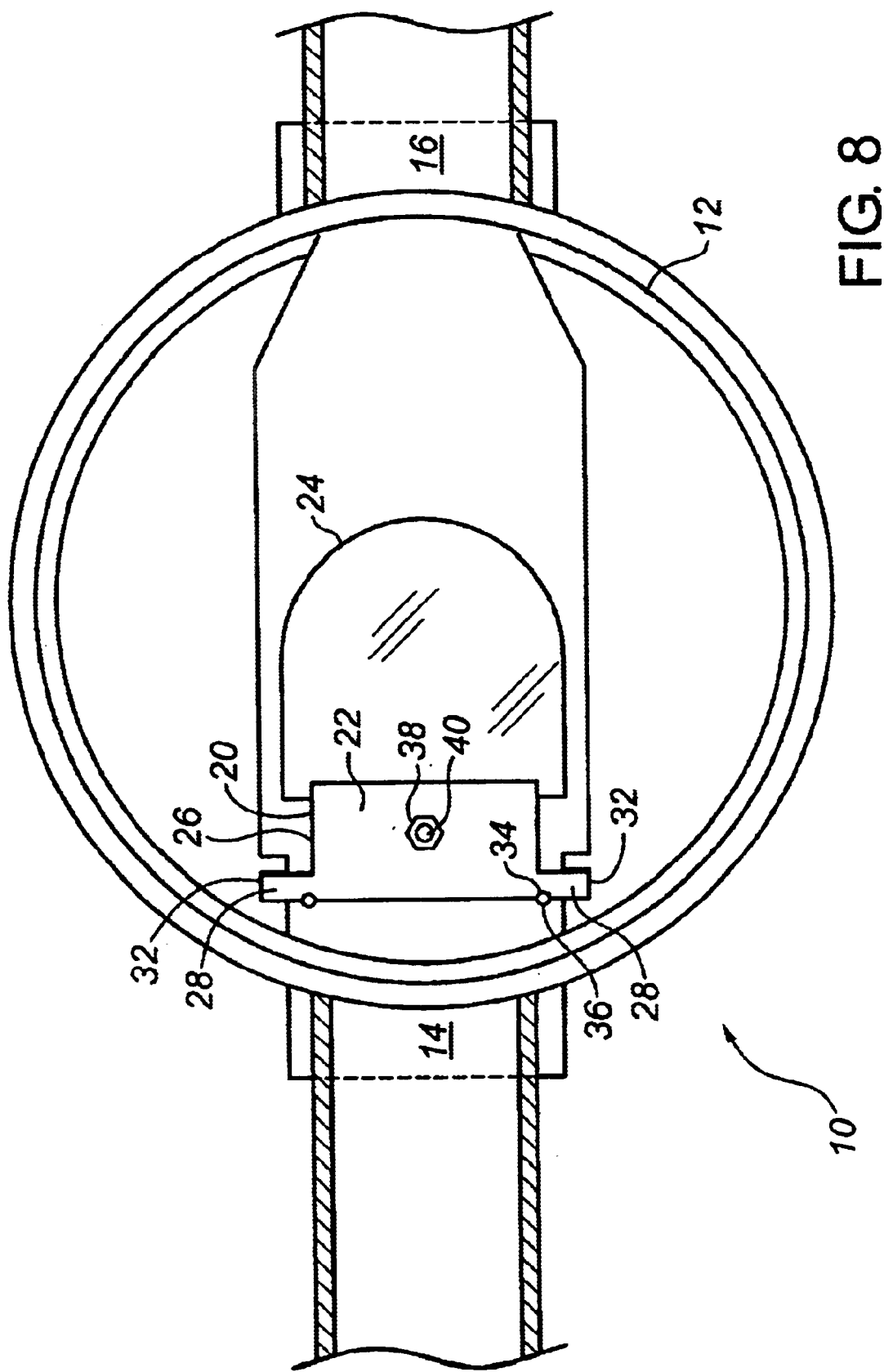
FIG. 8 is a top plan view, in section, of the valve inspection chamber illustrated in FIG. 7, with the valve cassette in position having the flapper valve member in the normally open orientation.

Structure and Relationship of Parts:

Referring to FIG. 1, there is provided a valve inspection chamber 10 which includes a housing 12 that has a first horizontal flow opening 14, a second horizontal flow opening 16, and a vertical inspection and valve retrieval opening 18. A valve cassette 20 is provided that includes a frame 22 and a valve member 24. Valve member 24 is movable relative to frame 22 between an open position and a closed position. Referring to FIG. 8, valve cassette 20 has peripheral side edges 26, each of which has a projecting tongue 28.

Figure 2:
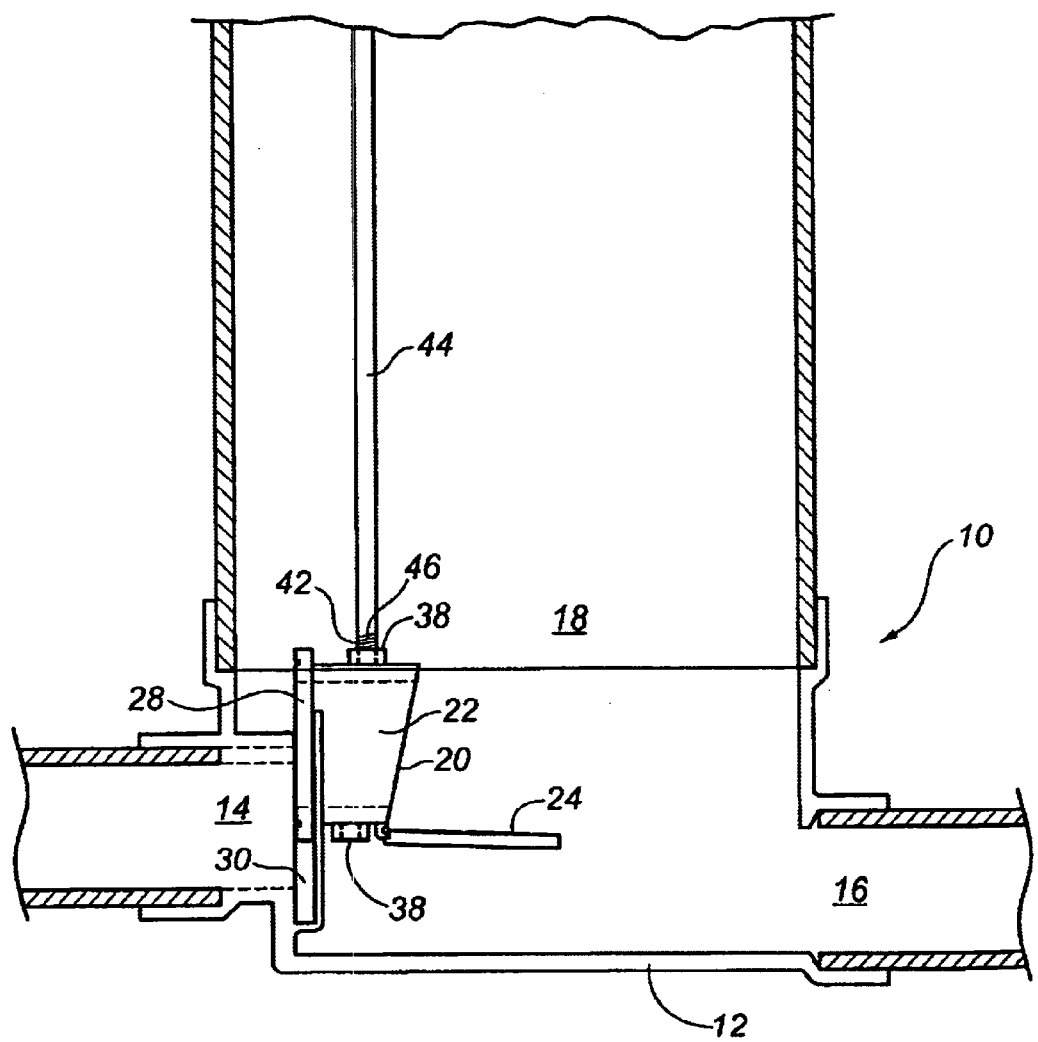
FIG. 2 is a side elevation view, in section, of the valve inspection chamber illustrated in FIG. 1, with valve cassette in the process of being retrieved with retrieval tool.
Figure 3:
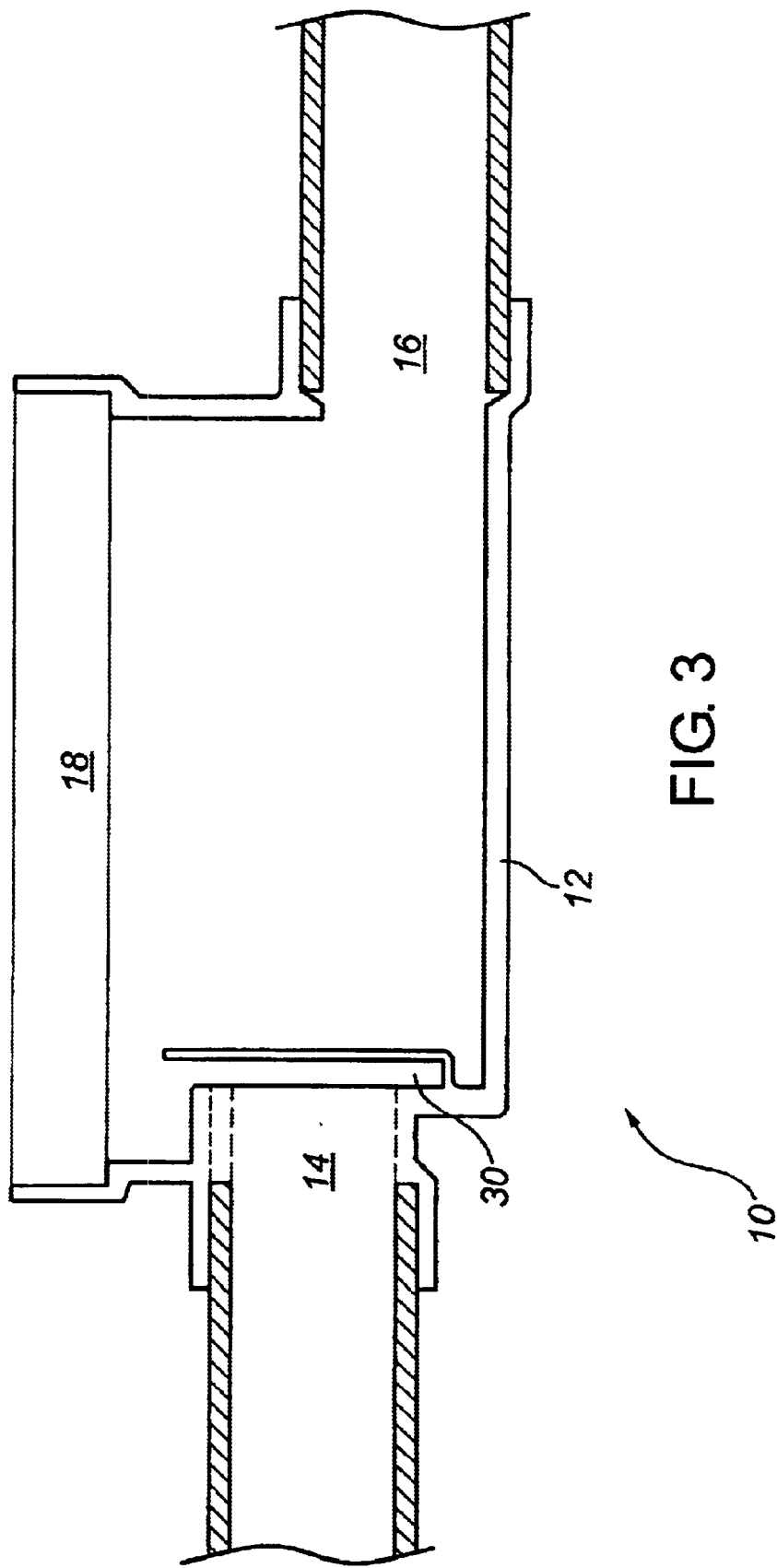
FIG. 3 is a side elevation view, in section, of the valve inspection chamber illustrated in FIG. 1, with the valve cassette removed.
Figure 4:
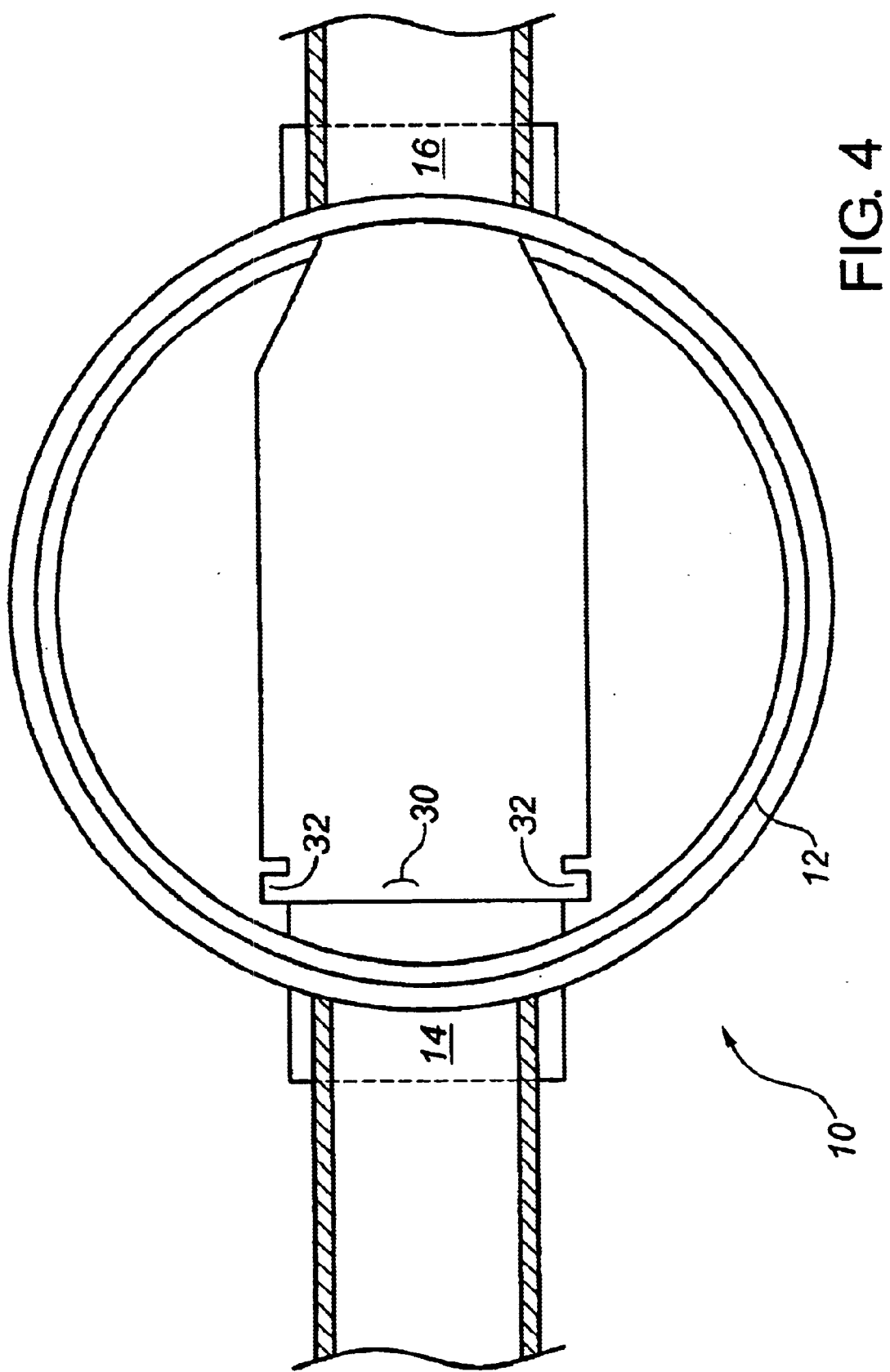
FIG. 4 is a top plan view, in section, of the valve inspection chamber illustrated in FIG. 1, with the valve cassette removed.
Figure 7:
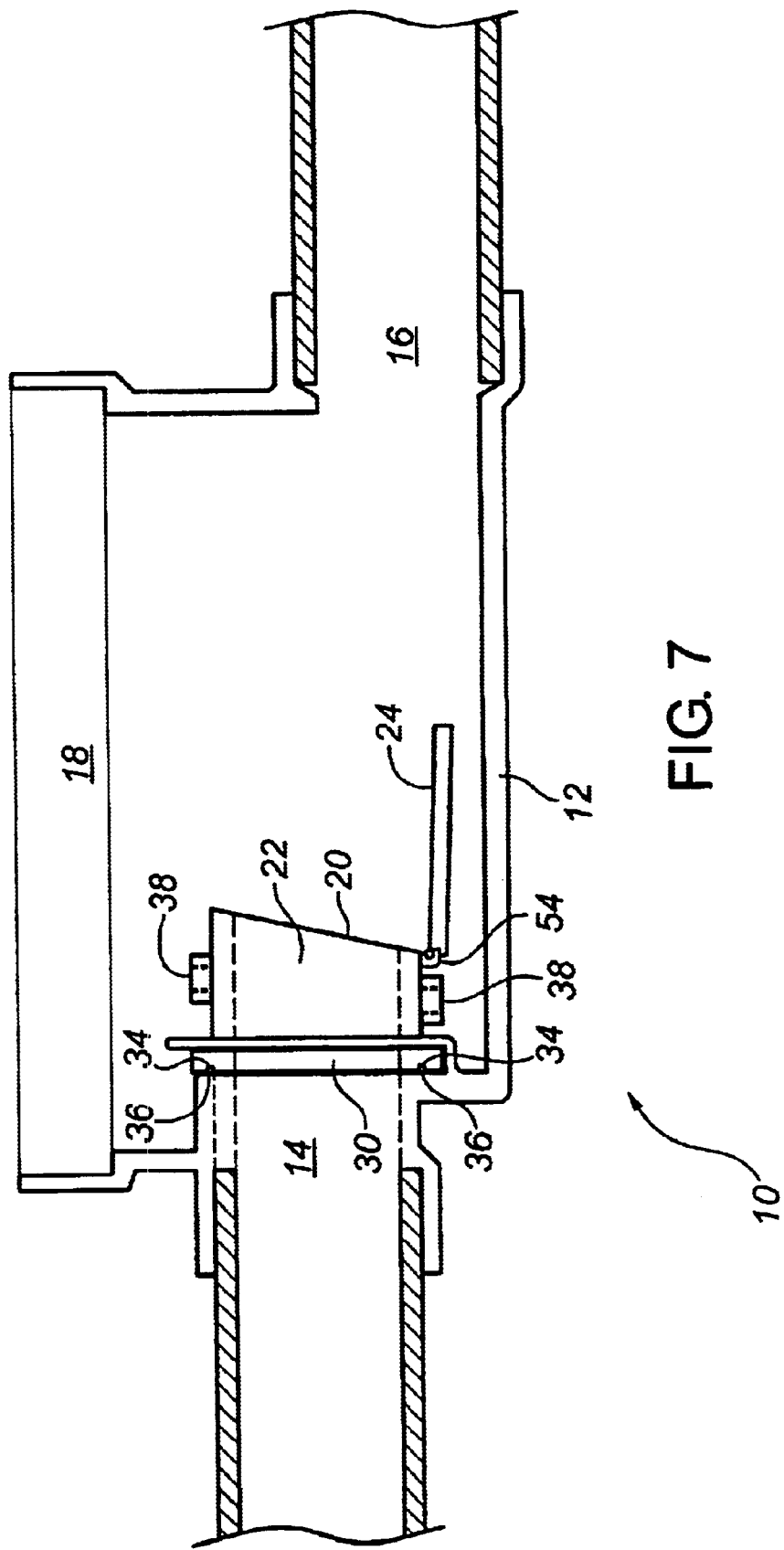
FIG. 7 is a detailed side elevation view, in section, of the valve inspection chamber illustrated in FIG. 1, with a valve cassette in position having a flapper valve member in a normally open orientation.

Referring to FIGS. 3 and 4, a valve cassette receptacle 30 is positioned in housing 12. Referring to FIG. 1, valve cassette receptacle 30 is positioned in a flow path of first horizontal flow opening 14 and aligned with vertical inspection and valve retrieval opening 18, such that valve cassette 20 can be inserted and retrieved through vertical inspection and retrieval opening 18. Referring to FIG. 2, valve cassette 20 is shown being removed from cassette receptacle 30. Referring to FIG. 8, valve cassette receptacle 30 has peripheral grooves 32 that matingly engage mating tongues 28 on valve cassette 20. Referring to FIG. 7, means is provided for maintaining valve cassette 20 in engagement with valve cassette receptacle 30 until a preset vertical force is exerted. In the illustrated embodiment, means includes a projection 34 on one tongue 28 and groove 32 that engages a recess 36 in another tongue 28 and groove 32.

Referring to FIG. 8, a female receptacle 38 with an internal engagement thread 40 is positioned on frame 22 of valve cassette. Referring to FIG. 2, female receptacle 38 and internal engagement thread 40 are adapted to receive an end 42 of a rod 44 that has an external thread 46. It will be appreciated that depending upon the configuration of a valve, female receptacle 40 could also be positioned on valve member 24.

Figure 11:
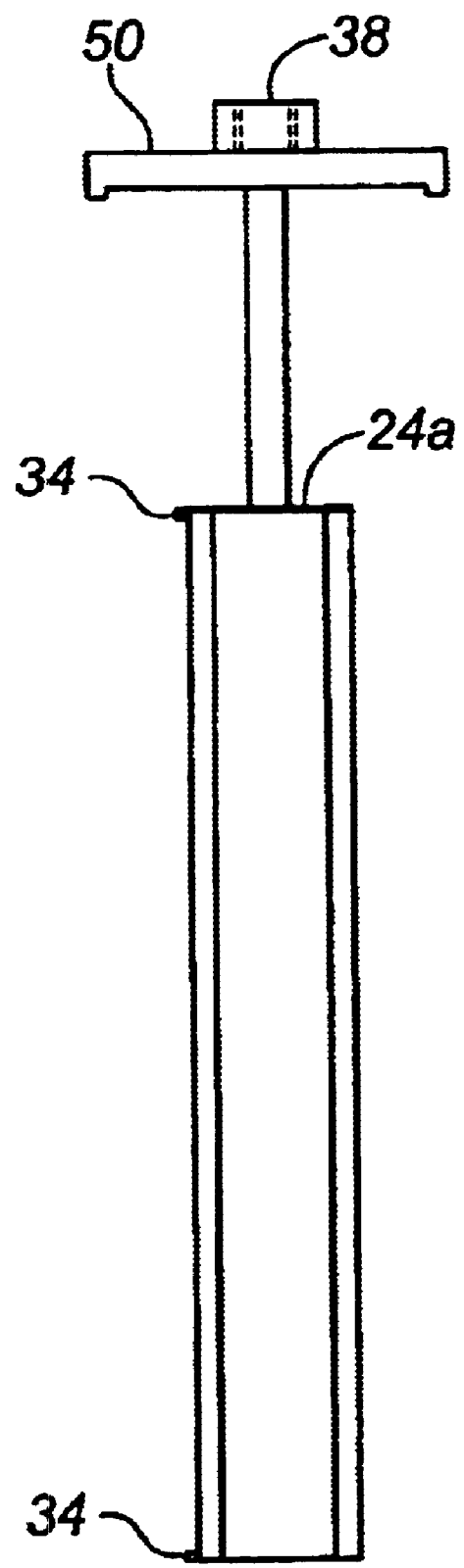
FIG. 11 is a side elevation view of a valve cassette from the valve inspection chamber illustrated in FIG. 1, with a gate valve member.
Figure 12:
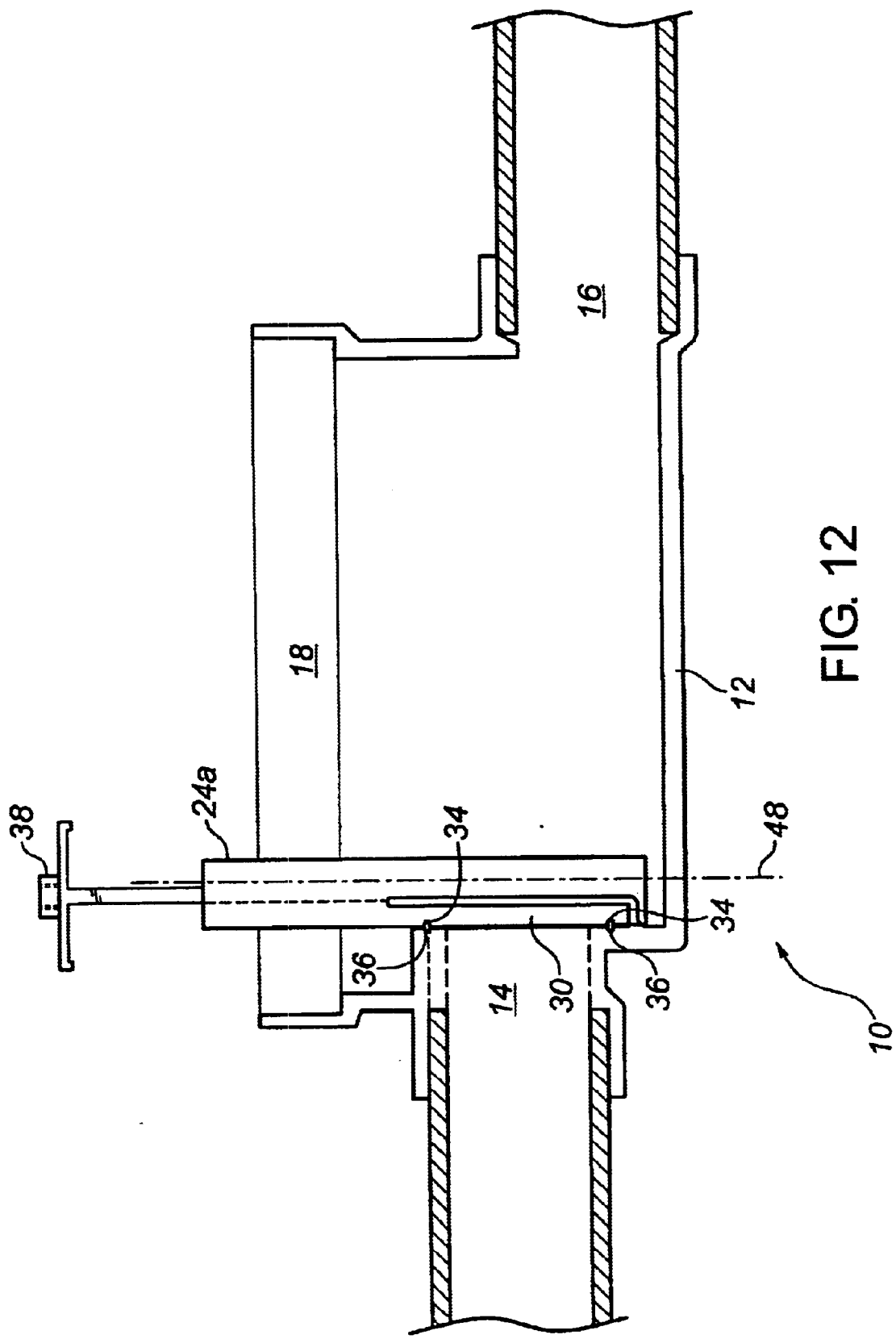
FIG. 12 is a detailed side elevation view, in section, of the valve inspection chamber illustrated in FIG. 1, with a valve cassette in position having a gate valve member.
Figure 13:
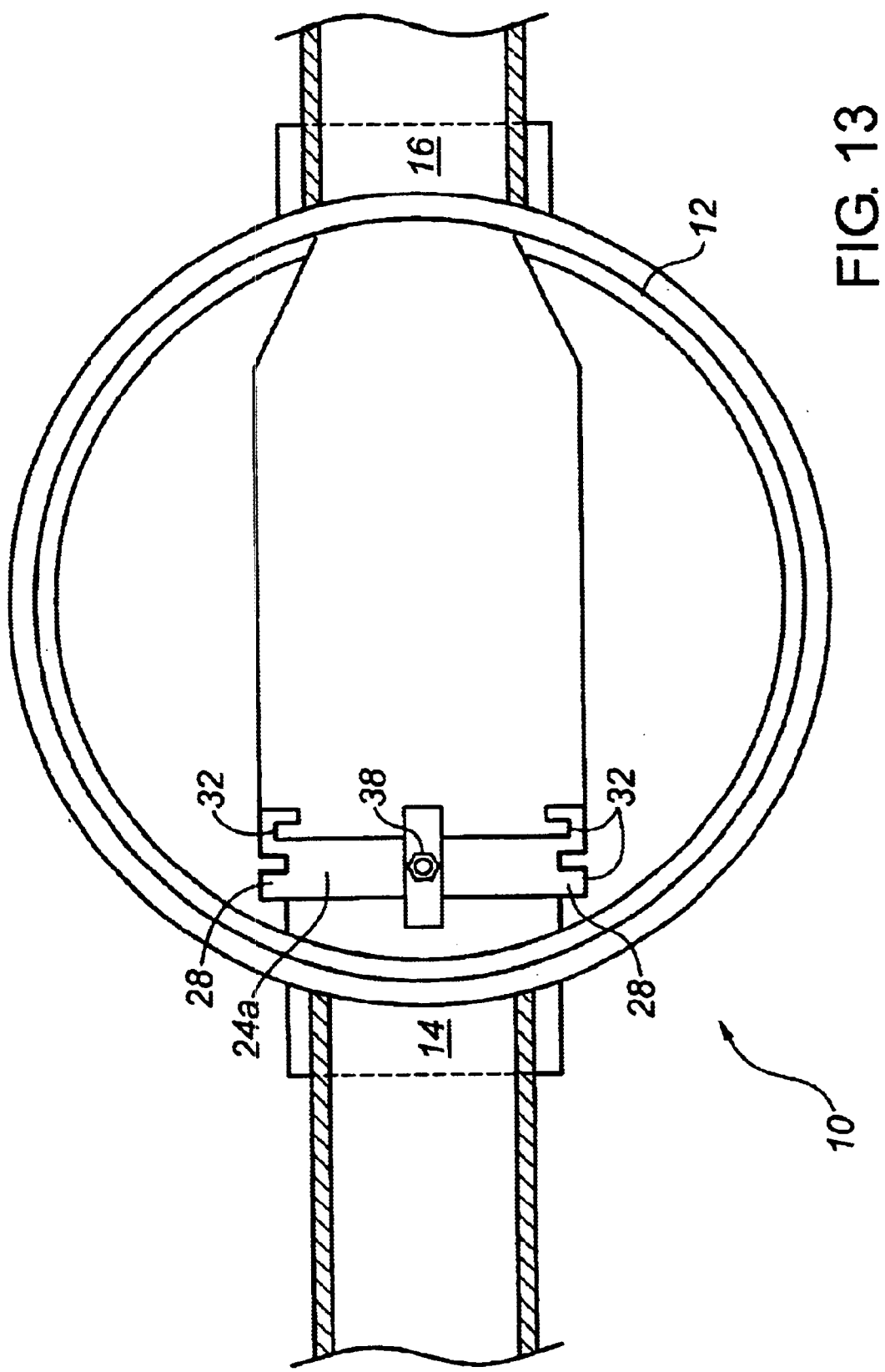
FIG. 13 is a top plan view, in section, of the valve inspection chamber illustrated in FIG. 12, with the valve cassette in position having the gate valve member.
Figure 14:
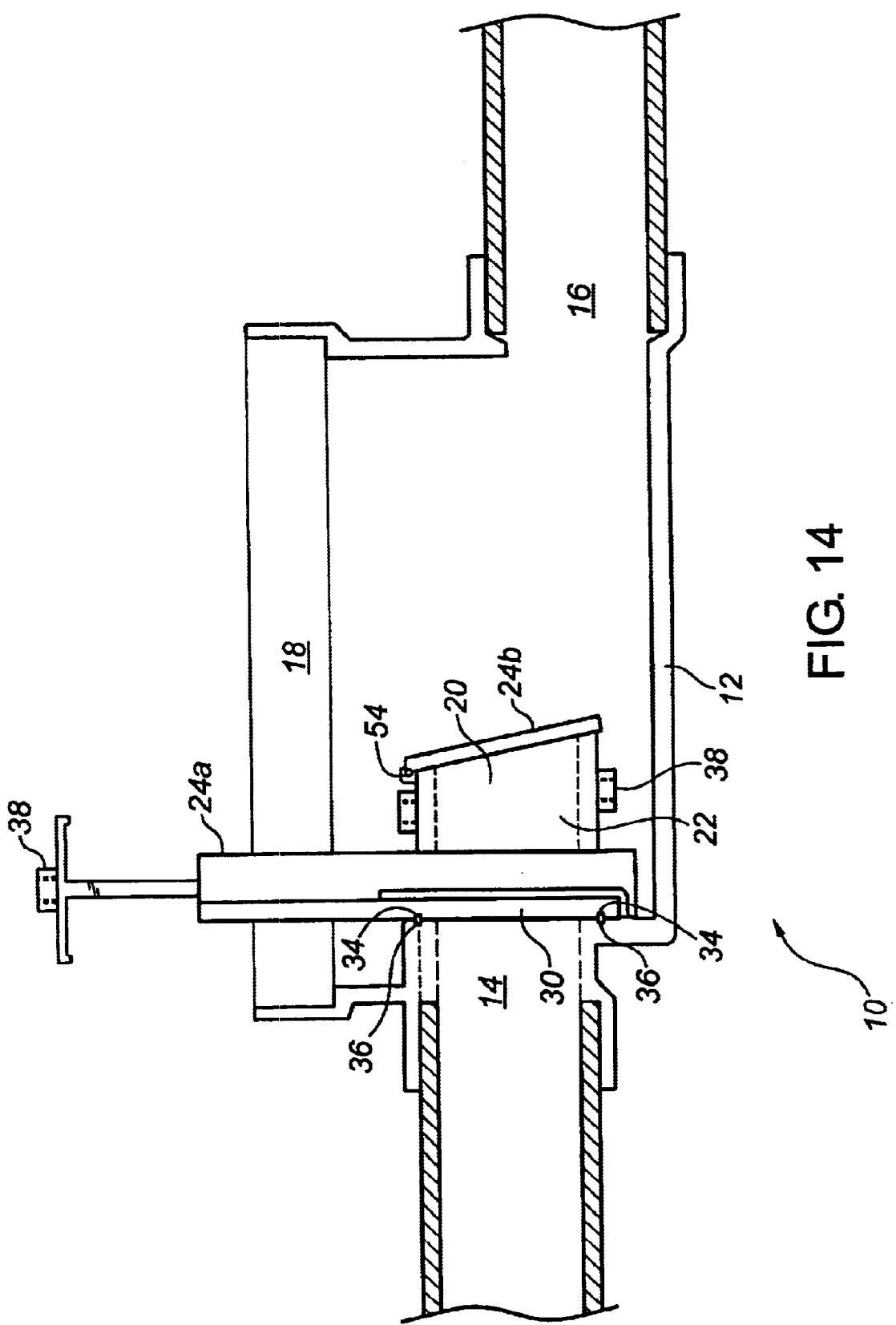
FIG. 14 is a detailed side elevation view, in section, of the valve inspection chamber illustrated in FIG. 1, with two valve cassettes in position including a gate valve member and a flapper valve member in a normally closed orientation.

Referring to FIGS. 12 through 14, valve inspection chamber 10 permits valve cassette 20 to slide into cassette receptacle 30 within housing 12 which is advantageous in that it can be adapted to accommodate a variety of valve such as gate valves and flapper valves. For example, referring to FIG. 12, valve member 24 is shown as a gate valve 24a that slides in frame 22 of valve cassette 20 on a vertical plane 48. Referring to FIG. 11, female receptacle 38 is positioned on top 50 of gate valve member 24a. This serves an additional function of providing a means of moving gate valve member 24a, to an open or closed position.

Figure 5:
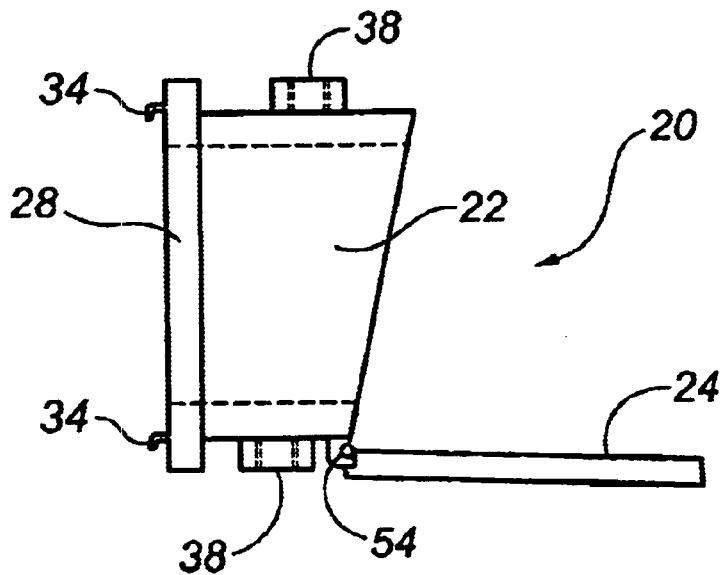
FIG. 5 is a side elevation view of a valve cassette from the valve inspection chamber illustrated in FIG. 1, with a flapper valve member in a normally open orientation.
Figure 6:
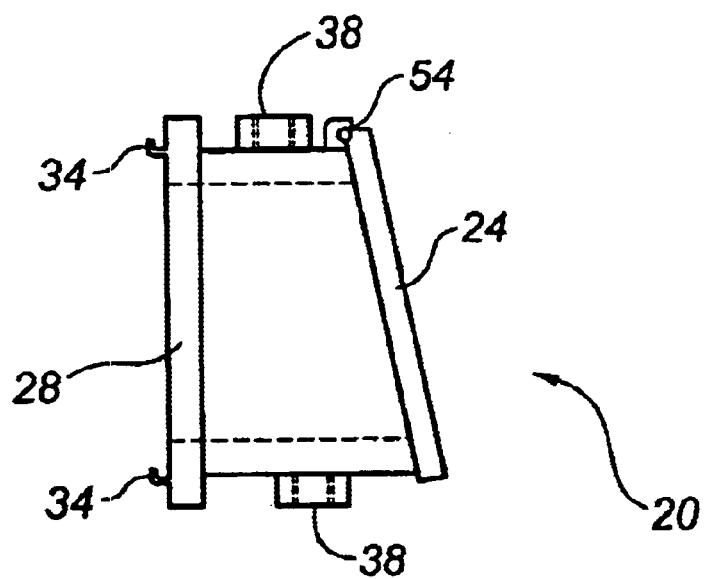
FIG. 6 is a side elevation view of a valve cassette from the valve inspection chamber illustrated in FIG. 1, with a flapper valve member in a normally closed orientation.

Referring to FIGS. 5 and 6, valve member 24 is a flapper valve member that has a hinge 54 that enables valve member 24 to pivot relative to frame 22 of valve cassette 20 about a horizontal axis 52, and one female receptacle 38 is positioned n frame 22 of valve cassette 20 adjacent hinge 54 and another of female receptacle 38 is positioned in opposed relation opposite to hinge 38, thereby enabling valve member 24 to be installed with flapper valve member 24 in either a normally open or a normally closed orientation. Referring to FIG. 5, valve member 24 is shown in a normally open position, while FIG. 6 illustrates valve member 24 in a normally closed position. Because of the convenience of removing and reinstalling valve members 24 in valve inspection chamber 10, valve members 24 can be easily changed from a normally closed position to a normally open position depending on the position required.

Figure 15:
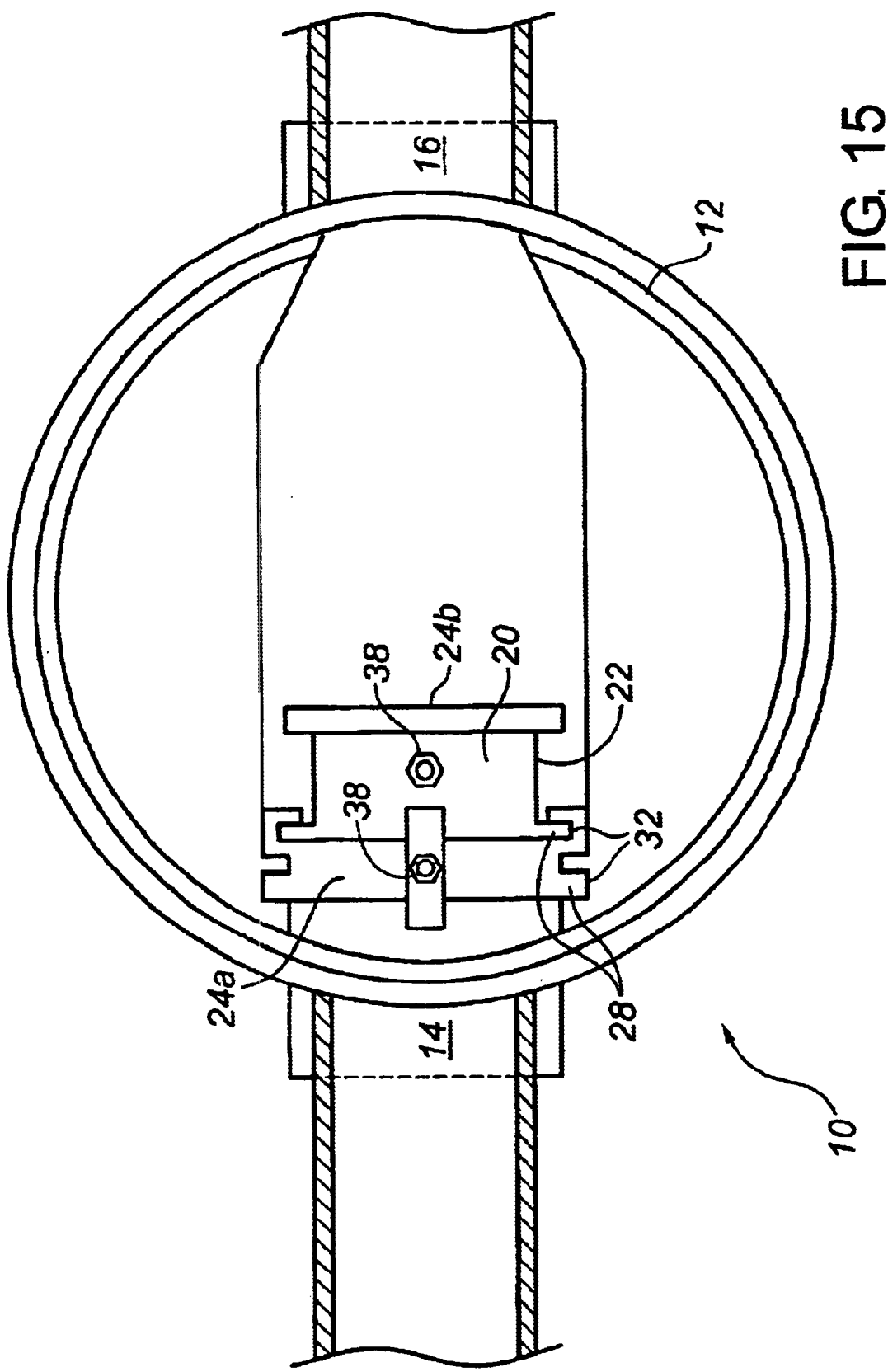
FIG. 15 is a top plan view, in section, of the valve inspection chamber illustrated in FIG. 14, with the two valve cassettes in position.
Figure 16:
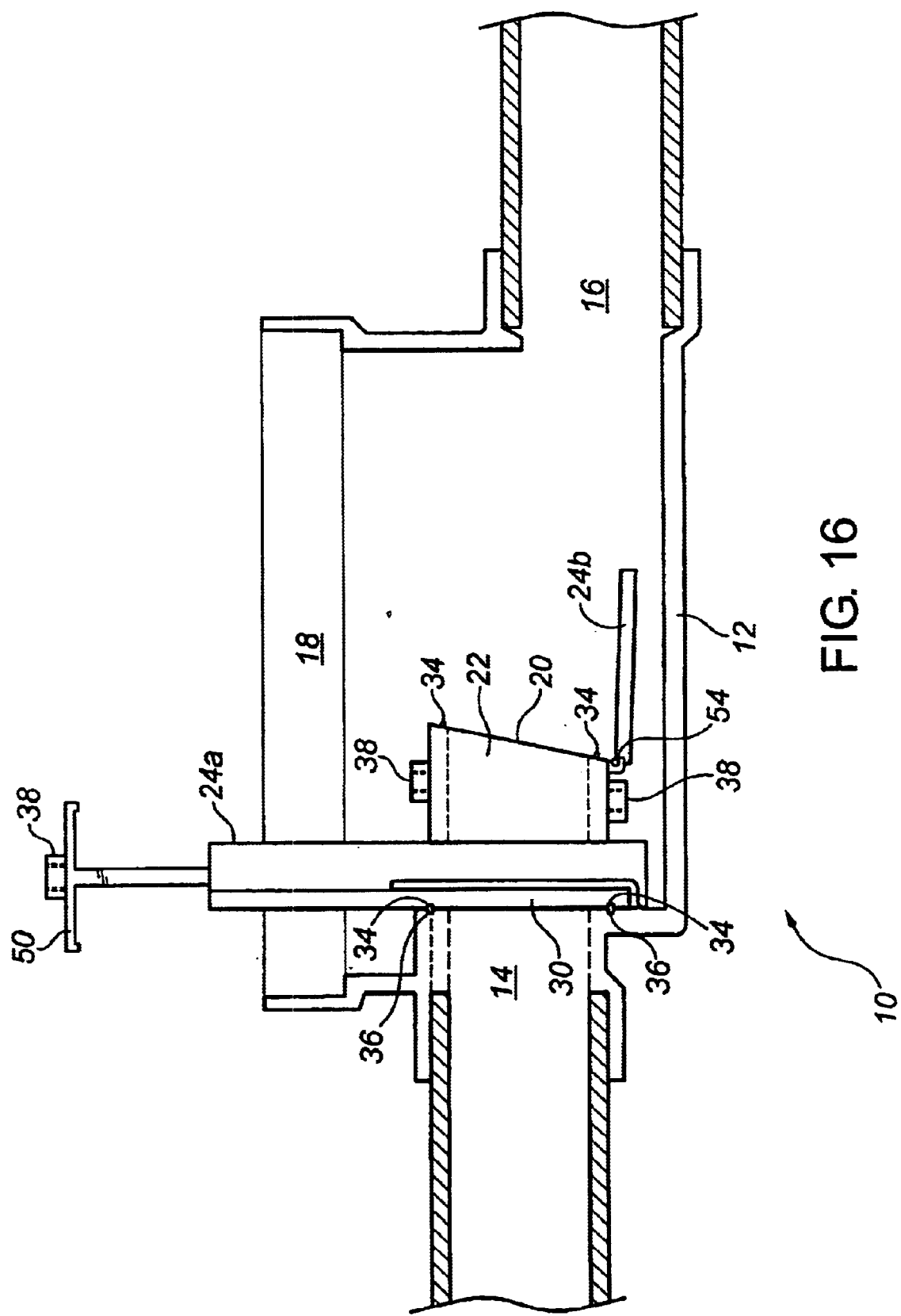
FIG. 16 is a detailed side elevation view, in section, of the valve inspection chamber illustrated in FIG. 1, with two valve cassettes in position including a gate valve member and a flapper valve member in a normally open orientation.
Figure 17:
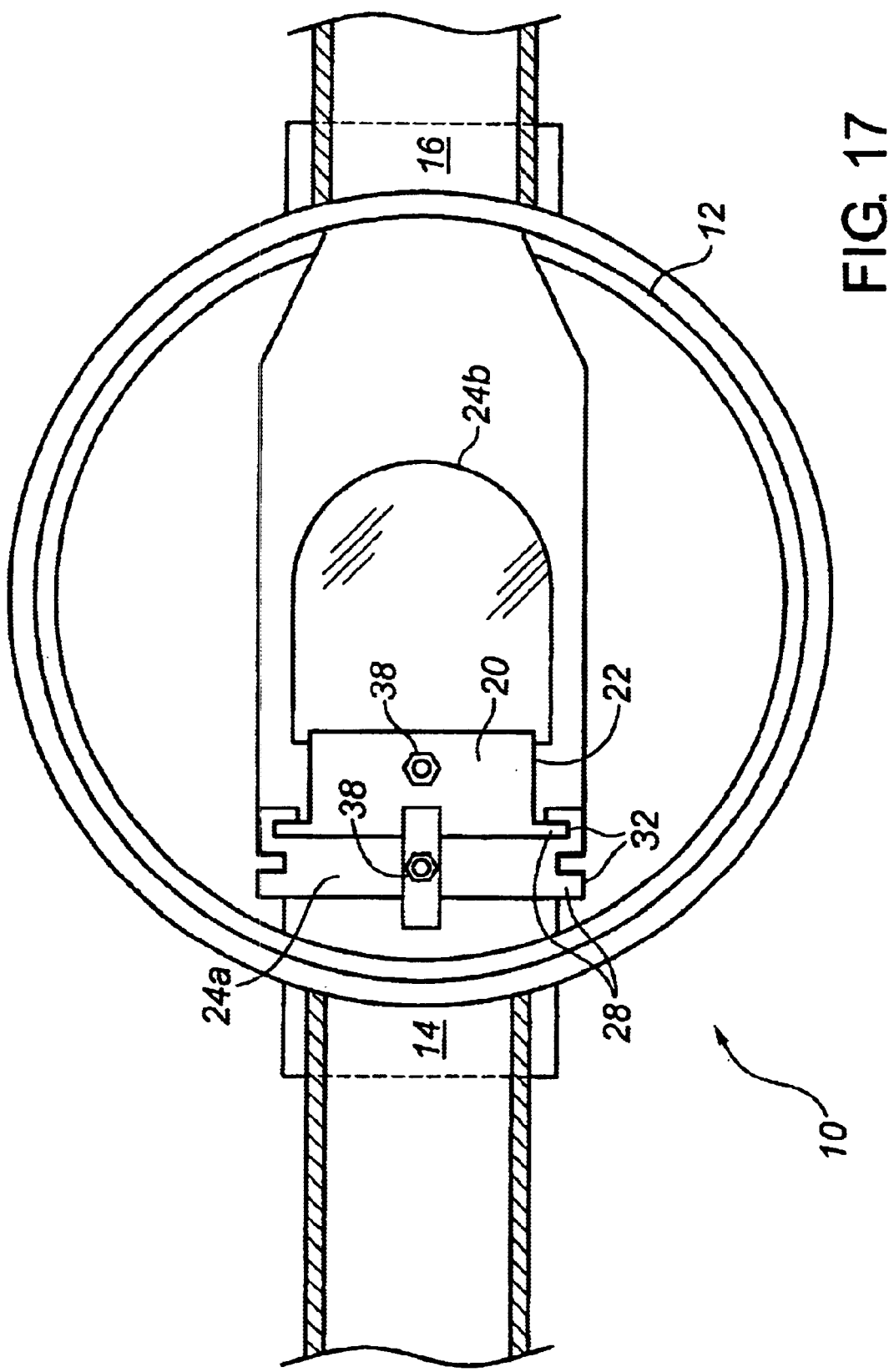
FIG. 17 is a top plan view, in section, of the valve inspection chamber illustrated in FIG. 16, with the two valve cassettes in position.

Referring to FIGS. 13 through 15, valve cassette 20 has valve cassette receptacle 30 adapted to receive a further valve cassette 20, thereby enabling a further valve member to be installed in housing 12. Referring to FIG. 14, for example, gate valve member 24a can be installed along with flapper valve member 24b. Two or more valve members 24 can be installed in this manner. Referring to FIGS. 16 and 17, gate valve member 24a and flapper valve member 24b have both been installed in valve inspection chamber 10. In the illustrated embodiment, flapper valve member 24b has been installed in the normally open position, however it will be appreciated that it could also be installed in the normally closed position as shown in FIG. 15. Furthermore it will be appreciated that there are a variety of other valves and installation configurations that can also be used in conjunction with valve inspection chamber 10.

Operation

The use and operation of valve inspection chamber will now be described with reference to FIGS. 1 through 17. Referring to FIG. 1, valve chamber allows valves that are buried more than 2 feet below a surface to be inspected and serviced without the use of a manhole. Referring to FIG. 2, valve inspection chamber permits valve cassette 20 to slide into valve cassette receptacle 30 within housing 12. This is done by use of a retrieval rod 44 which is inserted down vertical inspection and valve retrieval opening 18. Retrieval rod 44 has an externally threaded end 46 that is adapted to engage with internal engagement thread 40 of female receptacle 38 located on frame 22 of valve cassette 20. Once rod 44 is securely engaged with internal engagement thread 40 of female receptacle 38, vertical force is applied and valve cassette 20 can be lifted free of cassette receptacle 30 and removed from valve inspection chamber 10 for inspection or servicing.

Figure 9:
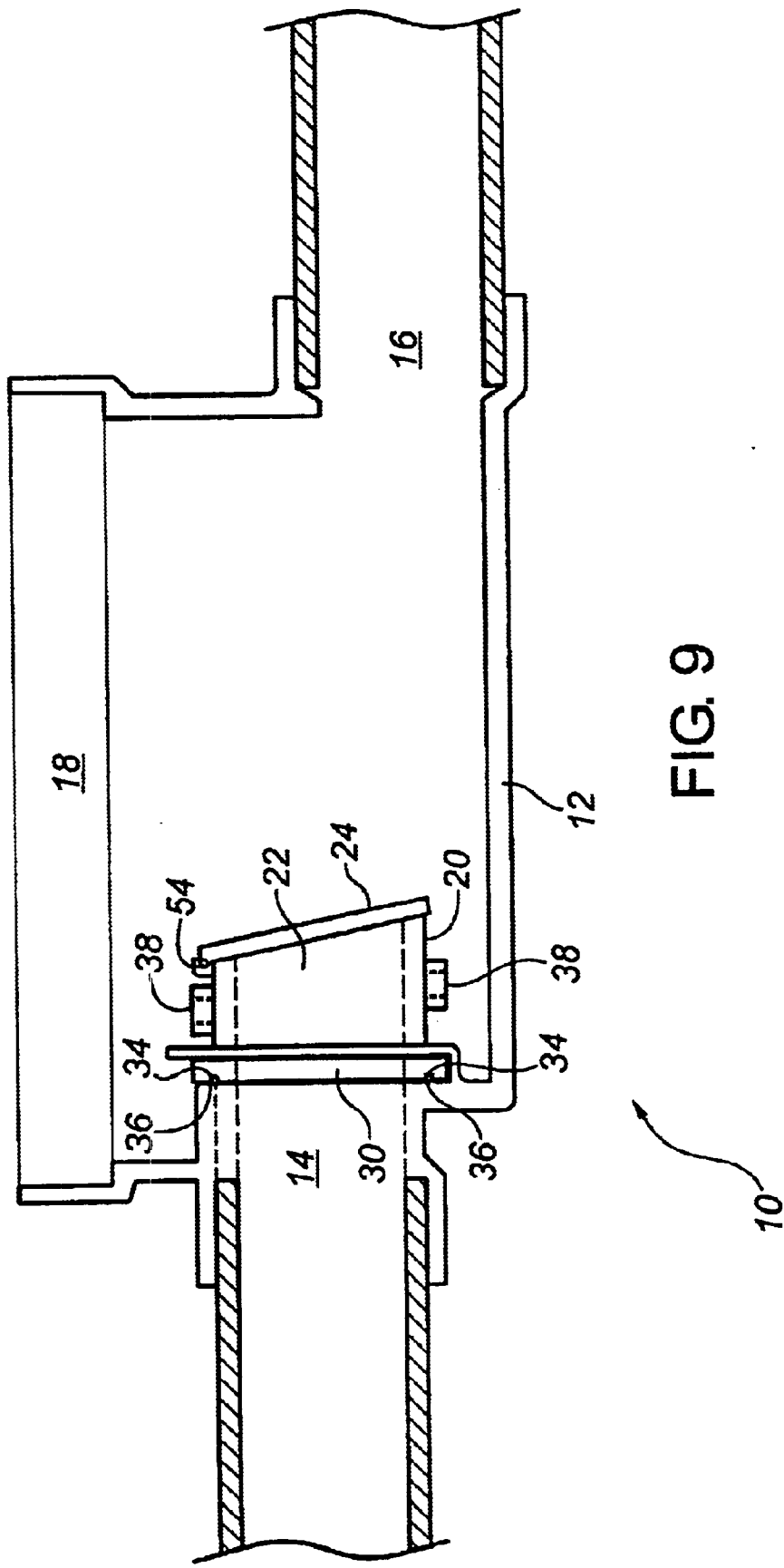
FIG. 9 is a detailed side elevation view, in section, of the valve inspection chamber illustrated in FIG. 1, with a valve cassette in position having a flapper valve member in a normally closed orientation.
Figure 10:
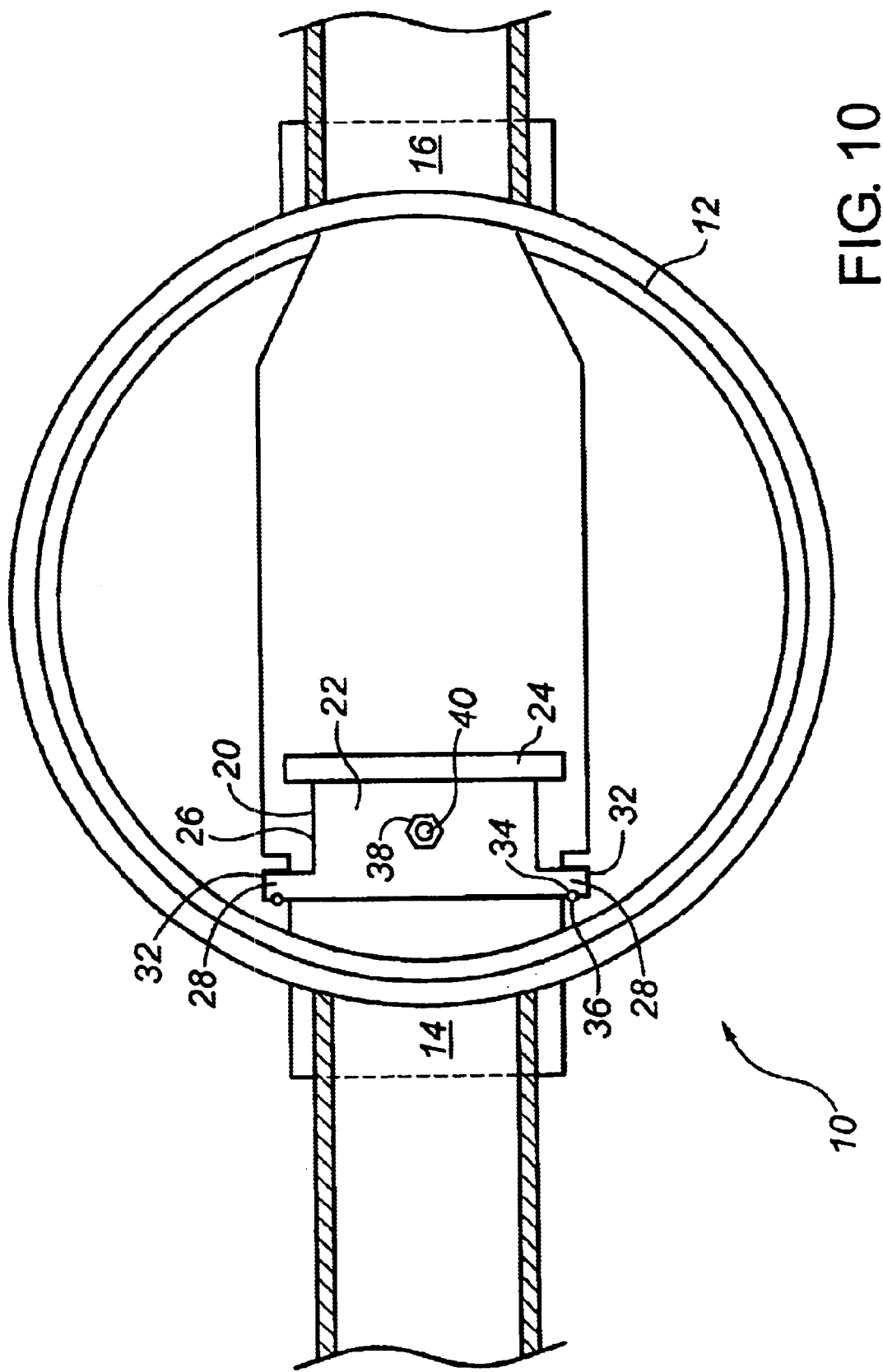
FIG. 10 is a top plan view, in section, of the valve inspection chamber illustrated in FIG. 9, with the valve cassette in position having the flapper valve member in the normally closed orientation.

Installation or reinstallation of valve cassette 20 is simplified as valve cassette 20 is threaded onto retrieval rod 44. Retrieval rod 44 and valve cassette 20 are then inserted down vertical inspection and valve retrieval opening 18. Retrieval rod 44 is used to position valve cassette 20 in cassette receptacle 30 in valve inspection chamber 10. Referring to FIG. 9, valve cassette 20 in is maintained in engagement with valve cassette receptacle 30 by means of projections 34 on one tongue 28 and groove 32 that engage recess 36 in another tongue 28 and groove 32 of valve cassette 20 and cassette receptacle 30. This engagement prevent valve cassette from floating out of position. Rod 44 is then unthreaded from female receptacle 38 to disengage, and can be removed by itself from vertical inspection and valve retrieval opening 18. Valve cassette 20 remains in place until it is necessary to inspect valve cassette 20 again.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

The embodiments of the invention in which an exclusive property or privilege is claimed are defined as follows:

1. A valve inspection chamber, comprising:
 a housing having a first horizontal flow opening, a second horizontal flow opening, and a vertical inspection and valve retrieval opening;
 a valve cassette including a frame and a valve member movable relative to the frame between an open position and a closed position when the valve cassette is positioned in situ within the housing;

a valve cassette receptacle positioned in the housing in a flow path of one of the first horizontal flow opening and the second horizontal flow opening and aligned with the vertical inspection and valve retrieval opening, such that at least a portion of the valve cassette can be slidably inserted in and retrieved from along a surface of the valve cassette receptacle and through the vertical inspection and retrieval opening;

means for maintaining the valve cassette in engagement with the valve cassette receptacle until a preset vertical force is exerted; and means for engaging a retrieval tool positioned on one of the frame and the valve member of the valve cassette for removal of the frame and the valve member as a single unit through the vertical inspection and retrieval opening.

2. The valve inspection chamber as defined in claim 1, wherein the valve cassette receptacle has engagement means along peripheral side edges that engage mating peripheral engagement means on the valve cassette.

3. The valve inspection chamber as defined in claim 2, wherein the engagement means on one of the valve cassette receptacle and the valve cassette is a tongue and the engagement means on an other of the valve cassette receptacle and the valve cassette is a groove.

4. The valve inspection chamber as defined in claim 3, wherein the means for maintaining the valve cassette in engagement with the valve cassette receptacle until a preset vertical force is exerted includes a projection on one of the tongue and the groove, that engages a recess in an other of the tongue and the groove.

5. The valve inspection chamber as defined in claim 1, wherein the means for engaging a retrieval tool is a female receptacle with an internal engagement.

6. The valve inspection chamber as defined in claim 5, wherein the internal engagement in the female receptacle is an internal thread which is adapted to receive an end of a rod having an external thread.

7. A valve inspection chamber, comprising:

a housing having a first horizontal flow opening, a second horizontal flow opening, and a vertical inspection and valve retrieval opening;

a valve cassette including a frame and a valve member movable relative to the frame between an open position and a closed position, the valve member being a flapper valve member that has a hinge that enables the flapper valve member to pivot relative to the frame of the valve cassette about a horizontal axis, the valve cassette having peripheral side edges with engagement means;

a valve cassette receptacle positioned in the housing in a flow path of one of the first horizontal flow opening and the second horizontal flow opening and aligned with the vertical inspection and valve retrieval opening, such that at least a portion of the valve cassette can be slidably inserted in and retrieved from along a surface of the valve cassette receptacle and through the vertical inspection and retrieval opening, the valve cassette receptacle having engagement means that matingly engage the engagement means on the valve cassette;

means for maintaining the valve cassette in engagement with the valve cassette receptacle until a preset vertical force is exerted; and a vertically aligned female receptacle with an internal engagement for engaging a retrieval tool positioned on the frame of the valve cassette for removal of the frame and the valve member as a single unit through the vertical inspection and retrieval opening.

8. The valve inspection chamber as defined in claim 7, wherein the engagement means on one of the valve cassette receptacle and the valve cassette is a tongue and the engagement means on an other of the valve cassette receptacle and the valve cassette is a groove.

9. The valve inspection chamber as defined in claim 8, wherein the means for maintaining the valve cassette in engagement with the valve cassette receptacle until a preset vertical force is exerted includes a projection on one of the tongue and the groove, that engages a recess in an other of the tongue and the groove.

10. The valve inspection chamber as defined in claim 7, wherein the internal engagement in the female receptacle is an internal thread which is adapted to receive an end of a rod having an external thread.

11. The valve inspection chamber as defined in claim 7, wherein the valve member is a gate valve that slides in the frame of the valve cassette on a vertical plane, and the female receptacle is positioned on top of the valve member.

12. The valve inspection chamber as defined in claim 7, wherein the valve member is a flapper valve member that has a hinge that enables the valve member to pivot relative to the frame of the valve cassette about a horizontal axis, and one of the female receptacle is positioned on the frame of valve cassette adjacent the hinge and another of the female receptacle is positioned in opposed relation opposite to the hinge, thereby enabling the valve member to be installed in either orientation.

13. The valve inspection chamber as defined in claim 7, wherein the valve cassette has a valve cassette receptacle adapted to receive a further valve cassette, thereby enabling a further valve to be installed in the housing.

14. A valve inspection chamber, comprising:

a housing having a first horizontal flow opening, a second horizontal flow opening, and a vertical inspection and valve retrieval opening;

a valve cassette including a frame and a valve member movable relative to the frame between an open position and a closed position, the valve cassette having peripheral side edges each of which has a projecting tongue;

a valve cassette receptacle positioned in the housing in a flow path of one of the first horizontal flow opening and the second horizontal flow opening and aligned with the vertical inspection and valve retrieval opening, such that at least a portion of the valve cassette can be slidably inserted in and retrieved from along a surface of the valve cassette receptacle and through the vertical inspection and retrieval opening, the valve cassette receptacle having peripheral grooves that matingly engage mating the tongues on the valve cassette;

means for maintaining the valve cassette in engagement with the valve cassette receptacle until a preset vertical force is exerted including a projection on one of the tongue and the groove, that engages a recess in an other of the tongue and the groove; and a female receptacle with an internal engagement thread positioned on one of the frame and the valve member of the valve cassette, the female receptacle and internal engagement thread being adapted to receive an end of a rod having an external thread, the valve cassette having a valve cassette receptacle adapted to receive a further valve cassette, thereby enabling a further valve to be installed in the housing.

15. The valve inspection chamber as defined in claim 14, wherein the valve member is a gate valve that slides in the frame of the valve cassette on a vertical plane, and the female receptacle is positioned on top of the valve member.

16. The valve inspection chamber as defined in claim 14, wherein the valve member is a flapper valve that pivots relative to the frame of the valve cassette about a horizontal axis, and the female receptacle is positioned on top of the frame of valve cassette.

17. The valve inspection chamber as defined in claim 14, wherein the valve member is a flapper valve member that has a hinge that enables the valve member to pivot relative to the frame of the valve cassette about a horizontal axis, and one of the female receptacle is positioned on the fame of valve cassette adjacent the hinge and another of the female receptacle is positioned in opposed relation opposite to the hinge, thereby enabling the valve member to be installed with the flapper valve member in either a normally open or a normally closed orientation.

\* \* \* \* \*

UNITED STATES PATENT AND TRADEMARK OFFICE
CERTIFICATE OF CORRECTION

PATENT NO. : 6,679,283 B1
DATED : January 20, 2004
INVENTOR(S) : G. Coscarella

It is certified that error appears in the above-identified patent and that said Letters Patent is hereby corrected as shown below:

Column 8,
Line 5, "fame" should read -- frame --

Signed and Sealed this

Fifteenth Day of June, 2004

JON W. DUDAS
*Acting Director of the United States Patent and Trademark Office*